F. M. GREGG.
PROCESS OF DRYING EDIBLE PASTES.
APPLICATION FILED JUNE 14, 1906.
1,007,940.
Patented Nov. 7, 1911.
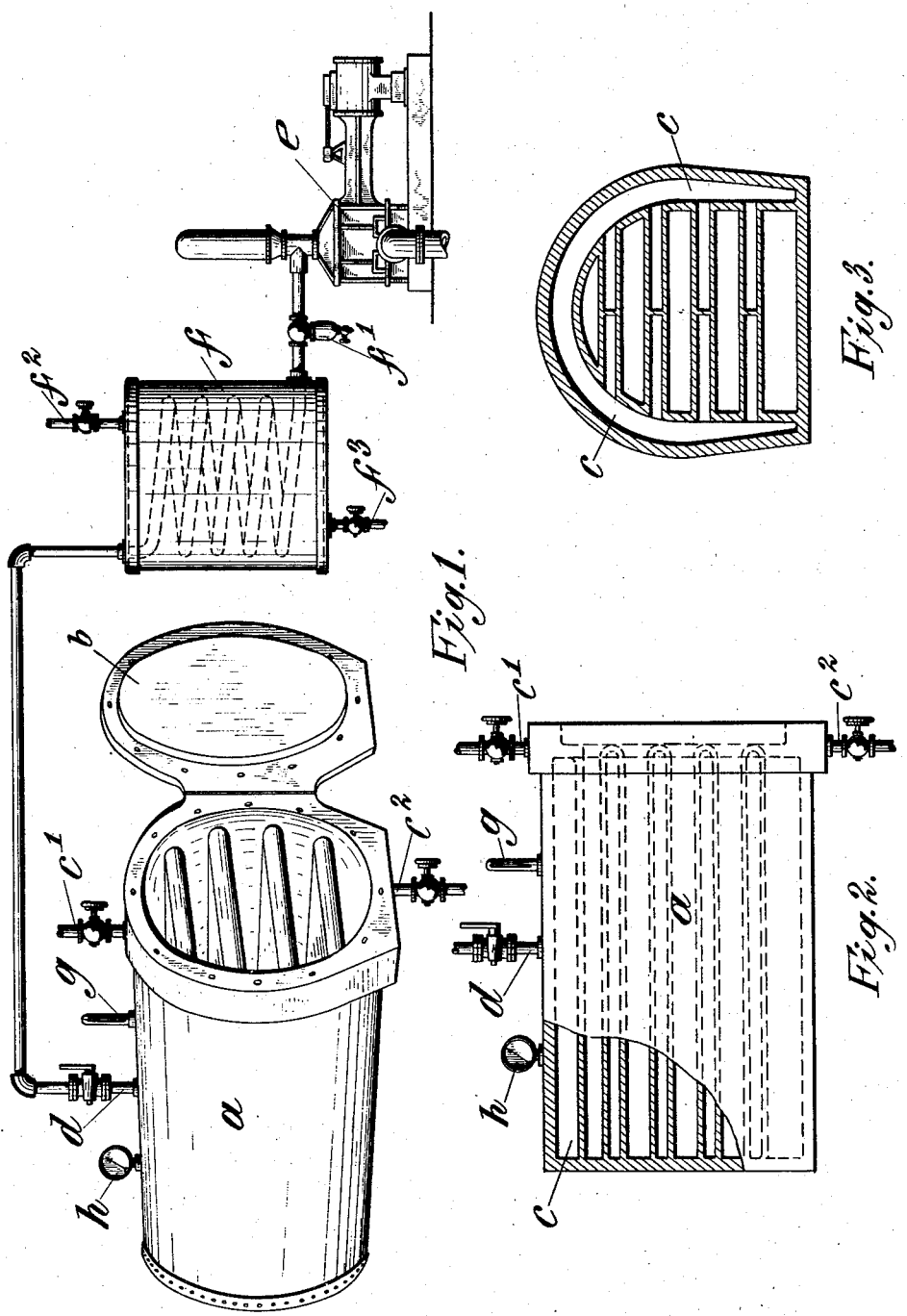

UNITED STATES PATENT OFFICE.

FRANK M. GREGG, OF CLEVELAND, OHIO.

PROCESS OF DRYING EDIBLE PASTES.

1,007,940.  Specification of Letters Patent.  Patented Nov. 7, 1911.

Application filed June 14, 1906. Serial No. 321,606.

*To all whom it may concern:*

Be it known that I, FRANK M. GREGG, a citizen of the United States, and a resident of Cleveland, in the State of Ohio, have invented certain new and useful Improvements in Processes of Drying Edible Pastes, of which the following is a specification, reference being had to the accompanying drawing, forming a part hereof.

All edible pastes such as macaroni, noodles, spaghetti, etc., are formed into the desired shape while in a moist or pasty condition and before such products can be sold or used it is necessary to subject them to a drying process. Heretofore it has been customary to dry such products under ordinary atmospheric pressure, usually in a room especially adapted for the purpose, wherein changes in temperature might be effected. This has required from two to seven days according to the nature of the product being treated and the atmospheric conditions.

The object of this invention is to provide a drying process for the edible paste which will require but a few hours instead of several days and which will be independent of weather conditions and which will produce a more uniform product than is possible under present conditions.

The accompanying drawing discloses one form of apparatus for practicing the method, but it is evident that many other forms of apparatus may be used for the purpose.

Figure 1 is a perspective view partly in elevation; Fig. 2 is a view of the retort partly in elevation, partly in section and a part broken away; and Fig. 3 is a cross-sectional view of the retort.

In said drawing $a$ represents a receptacle capable of being hermetically sealed, by suitable means, as a door or doors $b$ and is provided with suitable inlet and outlet pipes, $c'$ and $c^2$ respectively, whereby water or steam may be supplied thereto. Preferably the receptacle is provided with a series of hollow shelves which communicate through suitable openings or spaces with an annular space or chamber $c$ so that the steam or water admitted to said chamber may be caused to circulate throughout the receptacle to control the temperature thereof.

The interior of the receptacle $a$ is connected by means of a pipe $d$ with a vacuum pump $f$ shown diagrammatically at $e$. Between the pump and the receptacle is interposed a suitable condenser indicated at $f$ which is provided with an ordinary drip chamber as $f'$. Suitable inlet and outlet pipes $f'$ $f^2$ permit water to pass through the condenser. Preferably also the receptacle is provided with a thermometer $g$ and a vacuum gage $h$.

The edible paste to be treated is placed upon the shelves provided in the receptacle $a$ which is then hermetically sealed. The pump is thereupon set in motion and the air exhausted as completely as possible. The temperature in the interior of the receptacle is then successively raised and lowered a number of times in order to extract the moisture from the paste. Meanwhile the pump is kept in operation to draw off the moisture which has been extracted from the product being treated. The degrees of variation in the temperature and the length of time the treatment is continued depend of course upon the thickness of the product under treatment and the amount of moisture it contains when it is placed in the receptacle. For example, macaroni of ordinary thickness and in the usual condition prior to drying would be placed in the receptacle at a temperature of 75° F. and after the vacuum had been produced therein the temperature would be reduced to about 65° F., which temperature would be maintained for approximately one hour. The temperature would thereupon be raised to 75° F. and maintained at this temperature for approximately one hour. Again the temperature would be reduced to 65° F. for approximately one hour, when it would be raised to 75° F. at which temperature it would be maintained for several hours usually from two to three hours. The temperature would then be raised to 80° F. and maintained for about one hour and then gradually restored to the temperature of the external atmosphere. The vacuum would be gradually reduced until normal atmospheric pressure was obtained when the receptacle could be opened and the product removed.

Substantially the same variations in temperature and times of treatment are used with all edible pastes, but it is obvious that if the macaroni or other product being treated is unusually thick or is unusually moist when placed within the vessel the temperature and the time of treatment should be slightly increased. Whereas, on the contrary, if the product should be thinner than usual the temperatures and the length of time of the treatments should be correspondingly decreased.

By this process not only is the total time required for the drying of edible paste decreased from several days to a period of several hours, but the shape or form of the material being treated is preserved and furthermore the drying is uniform. This is especially important in the case of such products as macaroni which is usually made tube-shaped, since it is quite necessary to prevent the moisture from accumulating on the interior of the tube and thereby impairing the quality of the product. Such changes in the process as may be necessary for the different thicknesses of macaroni or other products or required by variations in the degree of moisture of the product are clearly within the skill of any one familiar with the manufacture of edible pastes and such changes may be made without departing from my invention, provided the process set forth in the following claims is employed.

I claim as my invention,—

1. A process of drying edible pastes which consists in placing the pastes in a receptacle, exhausting the air from the receptacle and alternately raising and lowering the temperature while the reduced air pressure is continuously maintained.

2. A process of drying edible pastes which consists in alternately raising and lowering the temperature of said pastes in a maintained vacuum and removing the moisture extracted from said pastes, substantially as described.

3. The process of drying edible pastes which consists in alternately raising and lowering the temperature of said pastes in a maintained vacuum, removing the moisture extracted from the pastes, and then maintaining the temperature without variation to complete the drying operation, substantially as described.

This specification signed and witnessed this 24th day of May, A. D. 1906.

FRANK M. GREGG.

Signed in the presence of—
 THOMAS J. CANTY,
 LUCIUS E. VARNEY.